(12) United States Patent
Eyres et al.

(10) Patent No.: US 10,172,293 B2
(45) Date of Patent: Jan. 8, 2019

(54) SOIL REMEDIATION COMPOSITION

(71) Applicant: Injekta Environmental Pty Ltd, Malvern, Victoria (AU)

(72) Inventors: Michael Eyres, Stirling (AU); Edward Dundas Scott, Middleton (AU)

(73) Assignee: Injekta Environmental Pty Ltd, Malvern Victoria (AU)

( * ) Notice: Subject to any disclaimer, the term of this patent is extended or adjusted under 35 U.S.C. 154(b) by 0 days.

(21) Appl. No.: 14/648,137

(22) PCT Filed: Nov. 29, 2013

(86) PCT No.: PCT/AU2013/001394
§ 371 (c)(1),
(2) Date: May 28, 2015

(87) PCT Pub. No.: WO2014/082138
PCT Pub. Date: Jun. 5, 2014

(65) Prior Publication Data
US 2015/0305251 A1  Oct. 29, 2015

(30) Foreign Application Priority Data

Nov. 30, 2012 (AU) .............................. 2012905259

(51) Int. Cl.
| | |
|---|---|
| *B09C 1/00* | (2006.01) |
| *A01G 7/00* | (2006.01) |
| *C09K 17/40* | (2006.01) |
| *C05G 1/00* | (2006.01) |
| *C05G 3/04* | (2006.01) |
| *C05G 3/06* | (2006.01) |
| *B09C 1/08* | (2006.01) |
| *C09K 17/14* | (2006.01) |

(Continued)

(52) U.S. Cl.
CPC .................. *A01G 7/00* (2013.01); *B09C 1/00* (2013.01); *B09C 1/08* (2013.01); *C05G 1/00* (2013.01); *C05G 3/04* (2013.01); *C05G 3/06* (2013.01); *C09K 17/14* (2013.01); *C09K 17/18* (2013.01); *C09K 17/32* (2013.01); *C09K 17/40* (2013.01)

(58) Field of Classification Search
USPC ....................................... 47/58.1 SC; 71/64.1
See application file for complete search history.

(56) References Cited

U.S. PATENT DOCUMENTS

| | | | | |
|---|---|---|---|---|
| 3,404,068 A | * | 10/1968 | Batistoni ................ | C09K 17/32 404/76 |
| 5,459,066 A | * | 10/1995 | Mestetsky .............. | B01D 17/00 210/632 |

(Continued)

FOREIGN PATENT DOCUMENTS

| | | |
|---|---|---|
| CN | 101683600 | 3/2010 |
| CN | 102154013 | 8/2011 |

(Continued)

OTHER PUBLICATIONS

Jean-Louis Salager, Surfactant Types and Uses, 2002, University of Los Andes, FIRP Booklet E300-A.*

(Continued)

*Primary Examiner* — Peter M Poon
*Assistant Examiner* — Morgan T Barlow
(74) *Attorney, Agent, or Firm* — Hovey Williams LLP

(57) ABSTRACT

Disclosed herein is a soil remediation and soil pore stabilising composition comprising at least one electrolyte and at least one cofactor.

13 Claims, 6 Drawing Sheets

(a)

(b)

(51) Int. Cl.
*C09K 17/18* (2006.01)
*C09K 17/32* (2006.01)

(56) References Cited

U.S. PATENT DOCUMENTS

| | | | | |
|---|---|---|---|---|
| 5,681,554 | A * | 10/1997 | Cannell | A61K 8/19 |
| | | | | 424/70.1 |
| 5,741,761 | A * | 4/1998 | Varadaraj | B09C 1/02 |
| | | | | 507/225 |
| 7,503,143 | B2 * | 3/2009 | Krysiak | A01C 1/046 |
| | | | | 47/58.1 SC |
| 2004/0074271 | A1 * | 4/2004 | Krysiak | A01C 1/046 |
| | | | | 71/27 |
| 2009/0054241 | A1 * | 2/2009 | Colucci | A01N 43/36 |
| | | | | 504/299 |
| 2009/0151243 | A1 * | 6/2009 | Detweiler | C05F 11/02 |
| | | | | 47/58.1 SC |
| 2011/0224080 | A1 | 9/2011 | Lelas et al. | |
| 2013/0074404 | A1 * | 3/2013 | Degaspari | A01N 25/00 |
| | | | | 47/58.1 R |
| 2014/0066405 | A1 * | 3/2014 | Nishimura | A01N 47/40 |
| | | | | 514/63 |
| 2014/0364456 | A1 * | 12/2014 | Sudau | C07D 487/04 |
| | | | | 514/338 |
| 2017/0226107 | A1 * | 8/2017 | Cerezo-Galvez | C07D 487/04 |

FOREIGN PATENT DOCUMENTS

| | | |
|---|---|---|
| CN | 102480922 | 5/2012 |
| IL | 99144 A | 11/1996 |
| WO | 92/03393 A1 | 3/1992 |
| WO | 00/38513 A1 | 7/2000 |
| WO | 2004/067699 A2 | 8/2004 |

OTHER PUBLICATIONS

Mulligan C.N. et al., "Surfactant-enhanced Remediation of Contaminated Soil: a Review", Engineering Geology, 2001, 60, pp. 317-380.*
Written Opinion dated Jan. 16, 2014 in corresponding PCT/AU2013/001394 filed on Nov. 29, 2013.
International Search Report dated Jan. 16, 2014 in corresponding PCT/AU2013/001394 filed on Nov. 29, 2013.
Mulligan et al., "Surfactant-enhanced remediation of contaminated soil: a review," Engineering Geology 60, 2001, pp. 371-380.
Wasay et al., "Remediation of Soils Polluted by Heavy Metals using Salts of Organic Acids and Chelating Agents," Environmental Technology, vol. 19, Issue 4, 1998, pp. 369-379 (abstract only available).
Office Action dated Feb. 3, 2017 in corresponding Chinese Patent Application No. 201380062066.7, 13 pages.
Machine Translation of CN101683600, 6 pages.
Machine Translation of CN102480922, 43 pages.
Vinod et al., "Internal erosional behaviour of lignosulfonate treated dispersive clay," 2010, University of Wollongong, Australia, 8 pages.
Vinod et al., "Elastic modules of soils treated with lignosulfonate," 2012, University of Wollongong, Australia, 7 pages.

* cited by examiner

SOIL REMEDIATION COMPOSITION

PRIORITY DOCUMENT

The present application claims priority to PCT International Patent Application No. PCT/AU2013/001394, filed 29 Nov. 2013, which claims priority from Australian Provisional Patent Application No. 2012905259 titled "SOIL REMEDIATION COMPOSITION" and filed on 30 Nov. 2012, the contents of both of which are hereby incorporated by reference in their entireties.

TECHNICAL FIELD

The present invention relates to compositions and methods for improving soil structure.

BACKGROUND

Soil structure is an important physical property of soil that relates to the arrangement of the solid parts of the soil and of the pore space located between them. As such, soil structure is important for soil function, plant growth and animal production. The benefits of good soil structure for the growth of plants include: reduced erosion due to greater soil aggregate strength and decreased overland flow; improved root penetration and access to soil moisture and nutrients; improved emergence of seedlings due to reduced crusting of the surface and; greater water infiltration, retention and availability due to improved soil porosity.

Cultivation generally leads to a decline in soil structure as mechanical manipulation of the soil compacts and shears soil aggregates and fills pore spaces. Continued cultivation and traffic also leads to compacted, impermeable layers or hard-pans within a soil profile. Irrigation also leads to a progressive decline in soil structure over time as aggregates break down and clay material is dispersed as a result of rapid soil wetting.

A number of approaches have been taken to preserve and improve soil structure, including increasing organic content by incorporating pasture phases into cropping rotations; reducing or eliminating tillage and cultivation in cropping and pasture activities; avoiding soil disturbance during periods of excessive dry or wet, ensuring sufficient ground cover to protect the soil from raindrop impact, and applying gypsum or calcium carbonate (lime) to exchange sodium ions with calcium ions, and thus to improve soil condition, permeability and infiltration. However, application or addition of gypsum or calcium carbonate may not be efficient enough for precision agriculture and conservation tillage systems due to their insolubility, high relative cost, and slow rate of effect.

There is a need for compositions or methods for improving soil structure that overcome one or more of the problems associated with known compositions or methods or which provide a useful alternative to known compositions and methods.

SUMMARY

In a first aspect, the present invention provides a soil remediation and soil pore stabilising composition comprising at least one electrolyte and at least one cofactor.

In embodiments, the soil remediation and soil pore stabilising composition further comprises at least one anionic surfactant.

In embodiments, the soil remediation and soil pore stabilising composition further comprises at least one elemental micronutrient.

In embodiments, the soil remediation and soil pore stabilising composition further comprises at least one wetting agent.

In embodiments, the soil remediation and soil pore stabilising composition further comprises at least one penetrant.

In embodiments, the soil remediation and soil pore stabilising composition further comprises at least one polymer.

In embodiments, the soil remediation and soil pore stabilising composition further comprises at least one flocculating agent.

In embodiments, the soil remediation and soil pore stabilising composition further comprises at least one emulsifier.

In embodiments, the soil remediation and soil pore stabilising composition further comprises at least one soil stabiliser.

In embodiments, the soil remediation and soil pore stabilising composition further comprises at least one complexing agent.

In some embodiments, the soil remediation and soil pore stabilising composition comprises at least one anionic surfactant, at least one elemental micronutrient, at least one penetrant, at least one flocculating agent, at least one emulsifier, at least one electrolyte, at least one soil stabiliser, and at least one complexing agent.

In other embodiments, the soil remediation and soil pore stabilising composition comprises at least one electrolyte, at least one cofactor, at least one anionic surfactant, at least one elemental micronutrient, at least one wetting agent, at least one penetrant, at least one polymer, at least one flocculating agent, at least one emulsifier, at least one soil stabiliser, and at least one complexing agent In embodiments, the composition is an aqueous solution.

In a second aspect, the present invention provides a method for improving a soil structure by stabilisation of aggregates, the method comprising applying the composition of the first aspect of the invention to soil.

In embodiments, the method is carried out by spraying. In other embodiments, the method is carried out using irrigation water. In embodiments, the method is carried out as an in-furrow treatment.

BRIEF DESCRIPTION OF THE ACCOMPANYING FIGURES

Illustrative embodiments of the present invention will be discussed with reference to the accompanying drawings wherein.

DETAILED DESCRIPTION

The present invention arises from our research into soil ameliorants. In particular, we have developed a composition that effectively changes soil production systems. The composition has been developed as an in-furrow treatment and is primarily used with minimum tillage sowing equipment to target soil issues directly and efficiently due to high solubility and high efficacy of the product.

The present invention provides a soil remediation and soil pore stabilising composition comprising at least one electrolyte and at least one cofactor.

Electrolytes are inorganic compounds, mainly ammonium, sodium, potassium, magnesium, calcium, chloride, and bicarbonate, that dissociate in solution into ions capable of conducting electrical currents and constituting a major force in controlling fluid balance within a solution. In living systems, electrolytes such as sodium, potassium and chloride are required by cells to regulate physiological charge and the flow of water molecules across the cell. Electrolytes suitable for use in compositions of the present invention include: sodium salts, potassium salts, calcium salts, magnesium salts, chloride salts, hydrogen phosphate salts, hydrogen carbonate (bicarbonate) salts, reacted hydrated calcium salts, acetate salts, ammonium salts, sulphate salts, nitrate salts and iron salts. Particularly useful electrolyte-based fertiliser solutions that can be used are calcium and potassium lignosulphonates, magnesium lignosulphonate, calcium sucrose carboxylate, calcium saccharate, potassium saccharate, magnesium saccharate and calcium citrate. In embodiments, the composition comprises these electrolyte compounds in a minimum amount of 50% by weight. A standard mix would be a specific mixture of reacted hydrated calcium compounds, polysaccharides, monosaccharides, potassium carboxylate, magnesium carboxylate, calcium carboxylate, tricarboxylic acids (primarily citric acid) and buffering and pH mediating solutions. The electrolyte may be present in the composition in an amount of from 25% to 85% of the total volume of the composition.

The cofactor is an organic molecule, such as a vitamin, that binds to an enzyme and is required for its catalytic activity. Cofactors are required for certain soil enzymes, called conjugated enzymes, to become active. The term "cofactor" as used herein includes vitamins, metallic ions and coenzymes within its scope. Vitamins are any of a group of organic substances essential in small quantities for normal cell function, acting as catalysts and coenzymes for metabolic processes and energy transfer, and may be essential for the function and Cofactors (including vitamins) suitable for use in compositions of the present invention include: thiamine pyrophosphate, thiamine monophosphate, thiamine mononitrate, riboflavin phosphate, nicotinic acid, folinic acid, pantothenic acid, cyanocobalomin, inositol monophosphate, inositol macinate, and inositol hexophosphate. The cofactor may be present in the composition in an amount of from 0.1% to 5% of the total volume of the composition.

Optionally, the soil remediation and soil pore stabilising composition further comprises one or more further constituents selected from the group consisting of: at least one anionic surfactant, at least one elemental micronutrient, at least one wetting agent, at least one penetrant, at least one polymer, at least one flocculating agent, at least one emulsifier, at least one soil stabiliser, and at least one complexing agent.

In specific embodiments, the soil remediation and soil pore stabilising composition comprises at least one electrolyte, at least one cofactor, at least one anionic surfactant, at least one elemental micronutrient; at least one wetting agent, at least one penetrant, at least one polymer, at least one flocculating agent, at least one emulsifier, at least one soil stabiliser, and at least one complexing agent.

The anionic surfactant may be any surfactant comprising an anionic functional head group, such as a sulphate, sulphonate, phosphate or carboxylate. In embodiments, the anionic surfactant is an alkyl sulphate. Suitable alkyl sulphates include ammonium lauryl sulphate, sodium lauryl sulphate and the related alkyl-ether sulphate, and sodium myreth sulphate. The anionic surfactant may be present in the composition in an amount of from 0.5% to 25% of the total volume of the composition.

Micronutrients are essential plant nutrients that are required by organisms in trace quantities (i.e. typically <50 mg/kg of soil or plant tissue). Micronutrients are required as catalysts for cellular reactions as well as having structural and integral roles. Micronutrients used in the composition of the present invention include zinc salts, ferric salts, ferrous salts, magnesium salts, manganese salts, cupric salts, boron salts, molybdenum salts, and cobalt salts. The micronutrient may be present in the composition in an amount of from 1.5% to 25% of the total volume of the composition.

The zinc salt may be selected from one or more of the group consisting of: zinc oxide, zinc chloride, zinc citrate, zinc nitrate, zinc salicylate, zinc sulphate, and zinc lignosulphonate.

The ferric salt may be selected from one or more of the group consisting of: ferric citrate, ferric fructose, ferric glycerophosphate, ferric nitrate, and ferric oxide.

The ferrous salt may be selected from one or more of the group consisting of: ferrous citrate, and ferrous gluconate.

The magnesium salt may be magnesium sulphate (Epsom salts).

The manganese salt may be selected from one or more of the group consisting of: manganese nitrate, manganese phosphate, and manganese sulphate.

The cupric salt may be selected from one or more of the group consisting of: cupric citrate, cupric gluconate, cupric nitrate, cupric salicylate, and copper sulphate.

The boron salt may be selected from one or more of the group consisting of: borax, potassium borotartrate, sodium borate, and sodium tetraborate.

The molybdenum salt may be selected from one or more of the group consisting of: calcium molybdate, potassium molybdate, and sodium molybdate.

The cobalt salt may be selected from one or more of the group consisting of: cobalt sulphate, and cobalt potassium sulphate.

The wetting agent may be any chemical agent capable of reducing the surface tension of a liquid in which it is dissolved. Wetting agents added to liquids make them more effective in spreading over and penetrating surfaces such as soil particles. Suitable wetting agents for use in compositions of the present invention include: alkylphenol ethoxylates (APE), nonylphenol ethoxylates (NPE), polyoxyethylene (POE), anionic linear surfactants,yucca or seaweed mixed with APE, EO/PO block copolymers, organosilicones, block copolymer and APG blends, and methyl capped block copolymers. The wetting agent may be present in the composition in an amount of from 0.5% to 5% of the total volume of the composition.

Penetrants are chemical substances that increase the ability of another chemical to apply its effect. These substances lower the surface tension of a liquid and thus cause it to penetrate or to be absorbed more easily. Suitable penetrants for use in compositions of the present invention include: di-octyl sulfosuccinate, polyoxyalkylene polymers such as alkyl amine oxide, the alkyl amine oxide being decyl dimethyl amine oxide, lauryl dimethyl amine oxide, myristyl dimethyl amine oxide, cetyl dimethyl amine oxide, or mixtures thereof Other compounds that may be used are alkyl ethoxylated quaternary ammonium compounds, a nonionic surfactant being an ethoxylate and salicylic acid. The penetrant may be present in the composition in an amount of from 0.3% to 5% of the total volume of the composition.

The polymer is a chemical compound or mixture of compounds consisting of repeating structural units. Suitable polymers include natural or synthetic compounds having a molecular structure built up chiefly or completely from a large number of similar units (monomers) bonded together. Polymers are generally compounds of relatively high molecular mass consisting of repeated, linked units, each of these monomers a relatively simple, low molecular mass molecule. Polymers suitable for use in compositions of the present invention include: synthetic anionic acrylic copolymers, poly(acrylamide-co-acrylic acid), polyelectrolytic polymers, starch or cellulose xanthate, acid-hydrolyzed cellulose microfibrils, chitosan, polyvinyl alcohol, hydrolysed polyethyl acrylates, polymethyl methacrylate, polycaproamide, hydrolyzed polyacrylonitrile (HPAN), isobutylene maleic acid (IBM), polyacrylamide (PAM), polyvinyl alcohol (PVA), sodium polyacrylate (SPA), vinylacetate maleic acid (VAMA) and hydrolyzed starch-polyacrylonitrile graft polymers. The polymer may be present in the composition in an amount of from 1% to 25% of the total volume of the composition.

For emulsions, flocculation describes clustering of individual dispersed droplets together, whereby the individual droplets do not lose their identity. Flocculation is thus the initial step leading to further aging of the emulsion (droplet coalescence and the ultimate separation of the phases). Flocculating agents in soils promote aggregation or clumping together of tiny, individual soil particles, especially in clay soils, into small structures called floccules. Flocculating agents suitable for use in compositions of the present invention include: iron sulphate, iron chloride, isinglass, calcium silicate, sodium silicate, gelatin, guar gum, xanthan gum, chitosan, and potassium alginates. The flocculating agent may be present in the composition in an amount of from 1% to 20% of the total volume of the composition.

An emulsifier is a surface-active agent that promotes the formation of an emulsion, which is a suspension of small globules of one liquid in a second liquid in which the first will not mix. Emulsifiers suitable for use in compositions of the present invention include: polyethoxylated phenols, guar gum, xanthan gum, and pectin. The emulsifier may be present in the composition in an amount of from 1.5% to 20% of the total volume of the composition.

A soil stabiliser is a substance that alters the engineering properties (e.g. structural stability) of a natural soil. For example, liquid copolymer emulsions are used to stabilize soil aggregates. The specific copolymer molecules coalesce forming ligands and bonds between aggregate particles in the soil. Soil stabilisers suitable for use in compositions of the present invention include: sodium humate, potassium humate, calcium humate, humic acid, fulvic acid, ulmic acid, calcium lignosulphonate, potassium lignosulphonate, magnesium lignosulphonate, sucrose, mannitose, glucose, fructose, corn steep liquor, corn starch, lactose, dextrose, raffinose, fructose phosphate, super sulphonated humate, mannitol, sorbitol, gluconic acid, pyruvic acid, malic acid, and glucaric acid. The soil stabiliser may be present in the composition in an amount of from 10% to 60% of the total volume of the composition.

A complexing agent is a substance that forms a co-ordination complex in the presence of surrounding ions (often a metal) or molecules. Various ligands (i.e. ions, molecules or molecular groups that bind to another chemical entity to form a larger complex) or complexing agents may surround the central constituent of the co-ordination complex. A complexing agent in this instance is a dissolved ligand that binds with a simple charged or uncharged molecular species in a liquid solution to form a complex, or coordination compound. Complexing agents suitable for use in compositions of the present invention include: saccharic acid, tannic acid, succinic acid, citric acid, calcium lignosulphonate, potassium lignosulfonate, ethylenediamine-N,N'-diaectic acid (EDDA), ethylenediamine-N,N,N',N'-tetraaectic acid (EDTA), trans-1,2-diaminecyclohexane-N,N, N',N'-tetraacetatic acid (CDTA), and N-(2-hydroxyethyl) ethylenediaminetriaectic acid (HEDTA). The complexing agent may be present in the composition in an amount of from 1% to 60% of the total volume of the composition.

The soil remediation and soil pore stabilising composition can be prepared by mixing desired amounts of the at least one electrolyte, the at least one cofactor, and any other contitutents and making the volume up to 100% with water.

The soil remediation and soil pore stabilising composition may also contain other non-soil active ingredients, such as dyes and the like.

Individual components of the soil remediation and soil pore stabilising composition of the invention may play more than one function role in the composition. For example, calcium lignosulphonate acts as a soil stabiliser, complexing agent and electrolyte (source of $Ca^{2+}$). It will be evident to the skilled person from the preceding listings of components that other components may also have more than one function in the composition.

The soil remediation and soil pore stabilising composition of the invention is especially suited to agricultural soil to increase soil aggregation (and hence oxygen availability and nutrient use efficiency) and soil aggregate stability (and thus structure, porosity and friability). This leads to enhanced water infiltration and nutrient utilisation in the soil profile for improved agricultural and horticultural production.

The composition can be tailored to suit a given son type based on appropriate soil condition analysis. From the testing guidelines the base parameters and proportions of base ingredients can be manipulated to provide desired effect on a given soil type (or series of particular soil types). The same specific key ingredients will remain in the solution but volumes of some ingredients will need to be varied to suit the soil type.

The composition can be added to soil to be treated at a rate of between 4 liters per Hectare and 20 liters per. Hectare in-furrow depending on soil conditions, crop- and cultivar type, date of planting and on the basis of available soil analysis data.

The combination of the components in the composition aids in the chemical stabilisation of soil particles, namely the clay fraction, and leads to cationic bridging of soil particles, bridging of organic compounds and binding of soil particles leading to enhanced soil aggregation and stabilisation.

Application of the composition of the present invention leads to an increase in soil porosity and pore connectivity leading to greater water infiltration and hydraulic conductivity. This also enhances the oxygen supply and flux in the soil atmosphere leading to greater nitrogen fertiliser efficiency due to reduced nitrous oxide emissions, which are 310 times more potent greenhouse gases than is carbon dioxide. Furthermore, not only is the soil porosity and pore connectivity increased, but also the stability of the pore system is maintained over multiple wet- and dry cycles.

Advantageously, all of the components of the composition are biodegradable products that occur naturally.

In a second aspect, the present invention provides a method for improving a soils structure by stabilisation of aggregates, the method comprising applying the composition of the first aspect of the invention to soil.

The composition may be applied to a soil in need of treatment by spraying, by addition to irrigation water and/or as an in-furrow treatment. For example, the composition can be applied to the soil using any of the various commonly used soil working implements.

EXAMPLES

Example 1

Preparation of a Soil Remediation and Soil Pore Stabilising Composition

An aqueous soil remediation and soil pore stabilising composition was prepared with the following components:

| Ingredient | Amount (vol %) | Function |
|---|---|---|
| Calcium lignosulphonate | 36% | Soil stabiliser, complexing agent and electrolyte (source of $Ca^{2+}$) |
| Potassium alginate | 1% | Flocculating agent |
| Water | 11% | Solvent/carrier |
| Magnesium lignosulphonate | 7.4% | Soil stabiliser and electrolyte (source of $Mg^{2+}$) |
| Ferrous citrate | 1.4% | Micronutrient (source of $Fe^{2+}$) |
| Calcium saccharate | 28% | Electrolyte (source of $Ca^{2+}$) |
| Nicotinic acid | 0.35% | Cofactor |
| Pantothenic acid | 0.25% | Cofactor |
| Tannic acid | 2.2% | Complexing agent |
| Corn steep liquor | 1.2% | Soil stabiliser |
| Glucose | 3% | Soil stabiliser |
| Potassium lignosulphonate | 3.4% | Soil stabiliser and electrolyte (source of $K^+$) |
| Chitosan | 3.2% | Polymer and flocculating agent |
| Xanthan gum | 1.6% | Emulsifier and flocculating agent |

Example 2

Soil Infiltration Tests

Soil infiltration tests on a highly sodic, highly dispersive hard pan were conducted using Mini-Disk Infiltrometers.

The test carried out compared the infiltration between water and the composition of the invention. The site was cleared, top soil removed down to the start of the B1 horizon—Sodic Hard pan. (approx 8 cm). Mini-Disk Infiltrometers were then set up on the hard pan. One tube contained the composition of the invention (1:5 water dilution) and another tube contained tap water (with blue water colouring for ease of viewing). Both tubes were setup with suction set at 2 cm (standard suction level).

Figure 1:
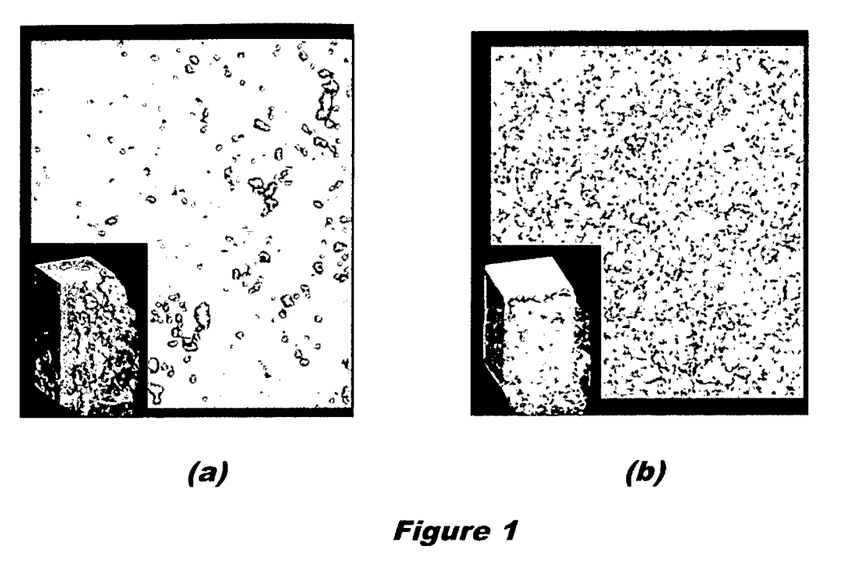
FIG. 1 shows cross sections and 3D images (insets) of CT scans of: (a) a soil sample treated with water only; and (b) a soil sample treated with an embodiment of the soil remediation and soil pore stabilising composition of the invention (Infiltrax™)
Figure 2:
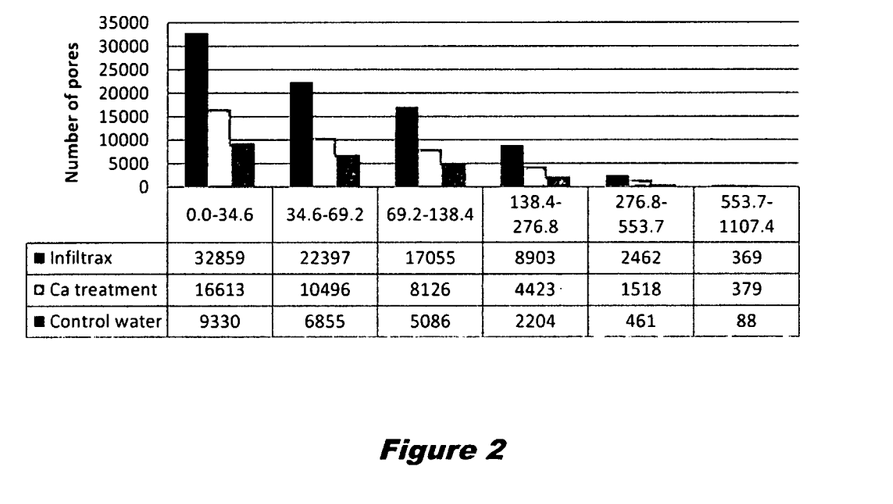
FIG. 2 shows a plot showing the number of pores in individual pore groups in soil treated with water only (right bars), with calcium ions (middle bars), and soil treated with an embodiment of the soil remediation and soil pore stabilising composition of the invention ("Infiltrax™"—left bars)
Figure 3:
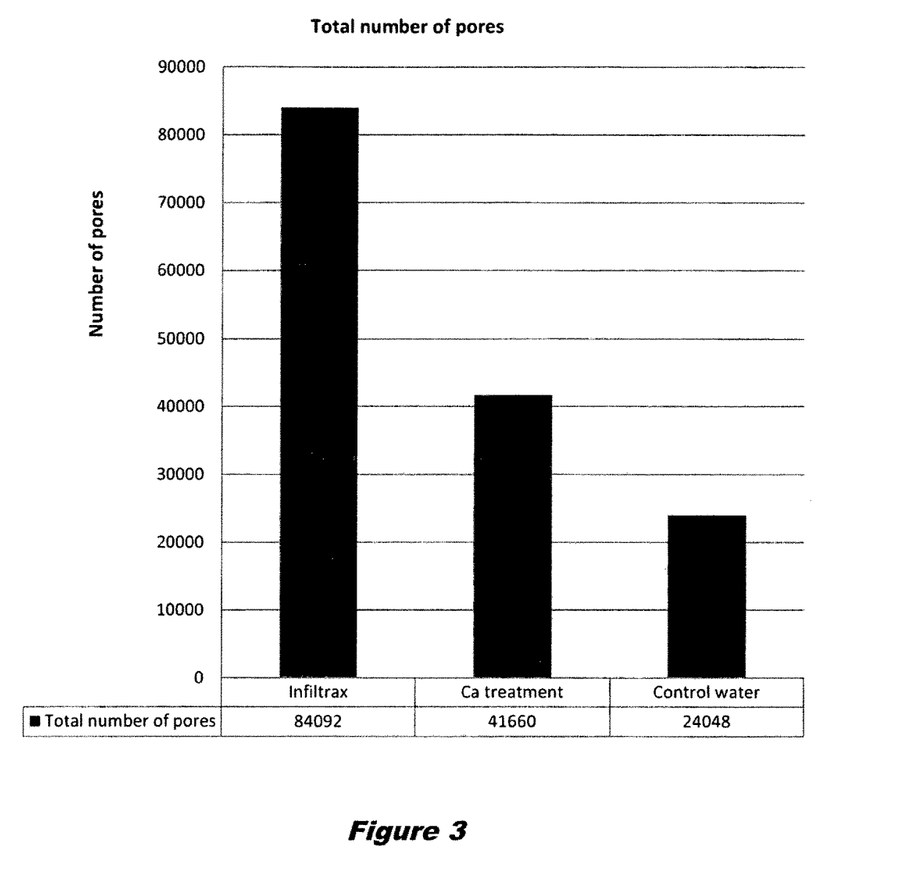
FIG. 3 shows a plot showing the total number of pores soil treated with water only, with calcium ions, and soil treated with an embodiment of the soil remediation and soil pore stabilising composition of the invention ("Infiltrax™")
Figure 4:
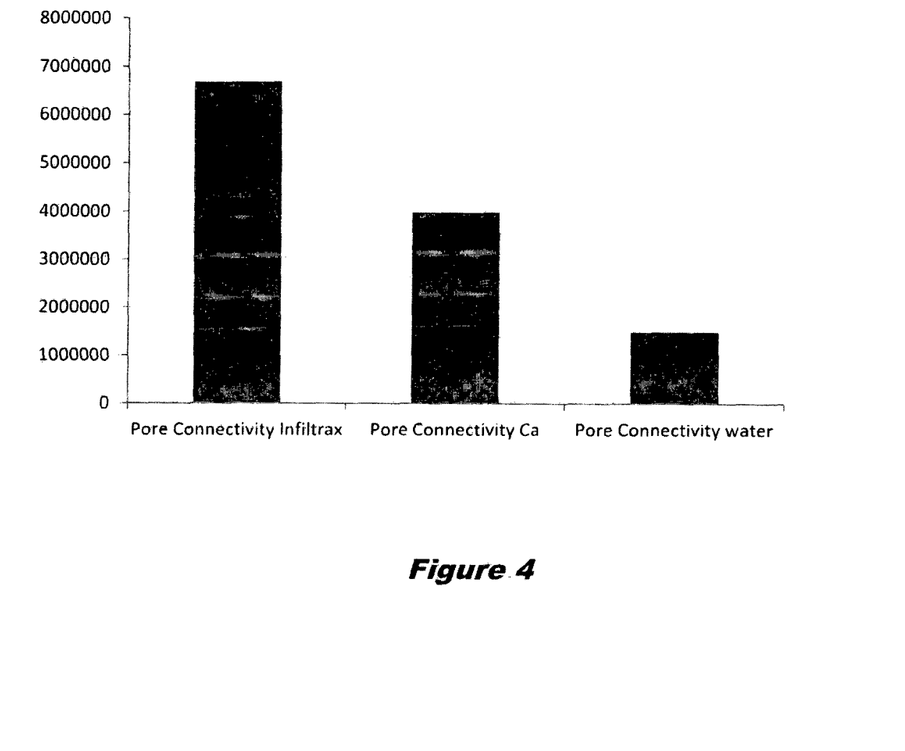
FIG. 4 shows a plot showing the pore connectivity of soil treated with water only, with calcium ions, and soil treated with an embodiment of the soil remediation and soil pore stabilising composition of the invention ("Infiltrax™")
Figure 5:
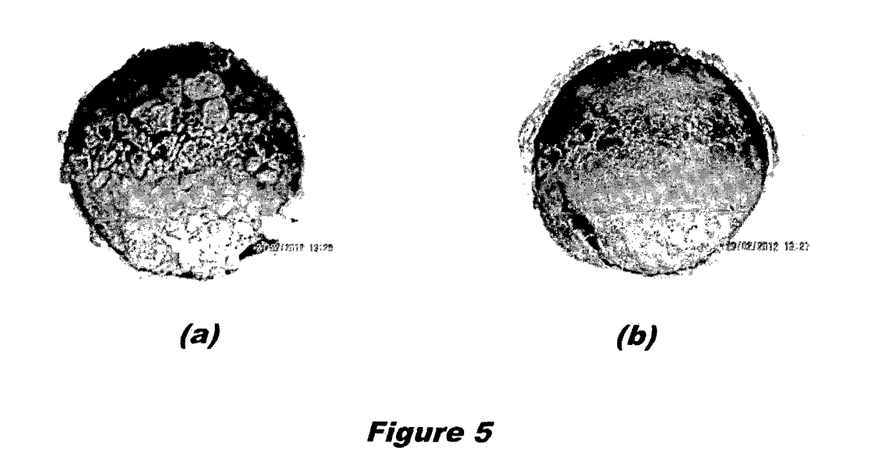
FIG. 5 shows photographs of soils treated (a) with an embodiment of the soil remediation and soil pore stabilising composition of the invention at 1:7 dilution, and (b) water only. The hydraulic conductivity of sample (a) was 10 ml per sec and sample (b) was 1 ml per 60 min.
Figure 6:
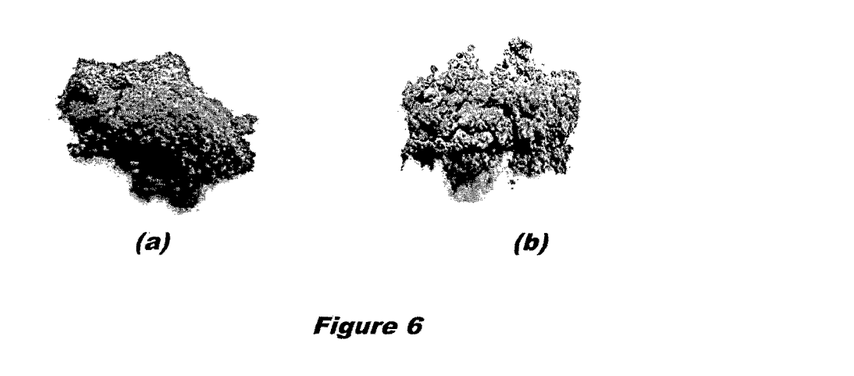
FIG. 6 shows the results of an Emerson aggregate test on: (a) soil treated with water only; and (b) the same soil treated with an embodiment of the soil remediation and soil pore stabilising composition of the invention diluted with water. The aggregates were dried naturally after being immersed in water.
Figure 7:
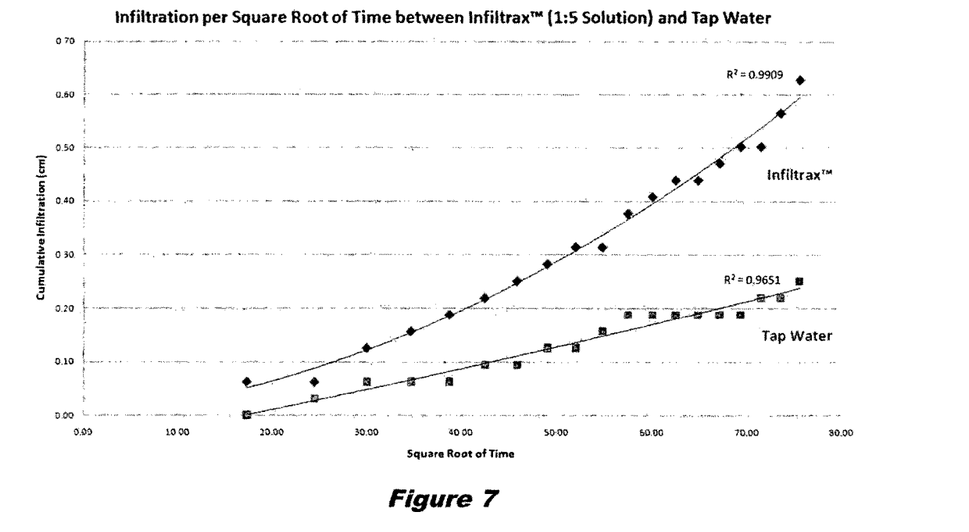
FIG. 7 shows soil infiltration curves after 1.5 hours of infiltration. Recordings were collected at 5 minute intervals. After 1.5 hours the infiltration of the composition of the invention ("Infiltrax™") showed over 2 times the infiltration of tap water.

FIG. 7 shows the soil infiltration curves after 1.5 hours of infiltration. Recordings were collected at 5 minute intervals. After 1.5 hours the infiltration of the solution containing the composition of the invention was over 2 times the infiltration of tap water.

Side tests were also carried out throughout the duration of the experiment. 20 mL of the composition of the invention and 20 mL of water were applied to the soil simultaneously side by side on the hard pan and infiltration was noted over 10 minutes. After 5 minutes water was still sitting on the surface treated with water only. On closer inspection, water cloudy, soil surface highly dispersed. In contrast, the surface treated with the composition of the invention showed full infiltration and the soil surface was very moist. After 10 minutes, the water on the water treated area was held in dispersive cloud on soil surface with extremely low aggregate stability. The water on the area treated with the composition of the invention had fully infiltrated with high aggregate stability. After 20 minutes water had infiltrated in both treated areas. A finger was then dragged across soil surface where both solutions were applied. The soil surface treated with water only fully was dispersed and sealed. At the area treated with the composition of the invention sealing occurred to a lesser effect and still remained partially aggregated.

The results of the experiment showed that the use of the composition of the invention at the lowest recommended dilution rate (1:5), has a marked effect on water infiltration. The composition aided infiltration by reducing dispersion rates and levels. The composition caused rapid changes to soil chemical structure increasing the aggregate stability which improved the soil physical qualities and allowed for great infiltration.

Example 3

Field Trials

In a trial, 6 soil sites were sampled, with the 4 most responsive soils (top two horizons) being used for further study.

Infiltration Trial: 4 Soil Types (A1 and A2 Horizon), infiltration using infiltrometers between treated and untreated
  1. Heavy Clay—Red Brown Earth—Mid North SA/NSW—Balaklava 2. Calcareous Red Brown Earth—Malice North—Victoria
3. Heavy Sodic Clay—Houstons Farm Tasmania
4. Kaolinite clay—Ongerup, Western Australia
5. Vertisol—Moree NSW
6. Vertisol—Forbes NSW CROSS Trial: Collecting soil from the 4 Australian soil types that may well respond to the addition of the composition of the invention—treated with 3 different rates of composition and analyse CROSS ratios and all other associated soil variables between treated and untreated.

Hydraulic Conductivity: 4 Soil Types—hydraulic conductivity calculated as a factor of infiltration and soil type.

Soluble Cations: The Soluble Cation tests can be used in comparison with exchangeable cation tests and the analysis done for the comparative effect the composition has for each test on all soil samples except control.

Soluble Cations: compare Soluble Cation data from the composition of the invention with lime, gypsum, dolomite, sand lime and other competitive products as deemed necessary and appropriate.

Soil: Houston Farm

| A horizon (0-30 cm) | S1 | 1, 3, 5, 7, 9 |
|---|---|---|
| A/B mixed (0-50 cm) | S3 | 2, 4, 6, 8, 10 |

Treatment Solutions

| Water-control | | Treatment T1 |
|---|---|---|
| Infiltrax- | EC = 3 dS/m | Treatment T2 |
| Infiltrax | EC 5 dS/m | Treatment T3 |
| Gypsum - | EC = 2.4 dS/m | Treatment T4 |
| CaCl$_2$ sol. | EC = 3 dS/m | Treatment T5 |

TABLE 1

Houston Farm Soil. Soluble and Exchangeable Cations.

| No | Soil ID | Treatment | CROSS | SAR | ECR % | ESP % | CEC |
|---|---|---|---|---|---|---|---|
|  | A |  | 1.14 | 0.72 | 9.2 | 1.3 | 6.5 |
|  | A/B | Original soil | 2.64 | 2.11 | 7.6 | 5.9 | 11.0 |
| 1 | A | Water | 1.19 | 0.83 | 9.18 | 2.03 | 5.95 |
| 2 | A/B | Water | 1.36 | 0.96 | 7.35 | 5.51 | 9.33 |
| 3 | A | Infiltrax 3 dS/m | 1.26 | 0.84 | 9.96 | 1.95 | 6.43 |
| 4 | A/B | Infiltrax 3 dS/m | 1.60 | 1.19 | 7.24 | 3.64 | 10.77 |
| 5 | A | Infiltrax 5 dS/m | 1.28 | 0.85 | 10.25 | 2.11 | 6.15 |

TABLE 1-continued

Houston Farm Soil. Soluble and Exchangeable Cations.

| No | Soil ID | Treatment | CROSS | SAR | ECR % | ESP % | CEC |
|---|---|---|---|---|---|---|---|
| 6 | A/B | Infiltrax 5 dS/m | 1.50 | 1.10 | 7.58 | 3.82 | 10.13 |
| 7 | A | Gypsum | 0.98 | 0.66 | 8.20 | 1.71 | 5.88 |
| 8 | A/B | Gypsum | 0.93 | 0.80 | 3.57 | 1.88 | 10.10 |
| 9 | A | CaCl$_2$ | 0.97 | 0.66 | 8.38 | 1.71 | 5.94 |
| 10 | A/B | CaCl$_2$ | 0.96 | 0.68 | 4.09 | 2.37 | 9.35 |

TABLE 2

X-Ray CT Scanning Results.

| Treatment | | water | | 3 dS/m Infiltrax | | 5 dS/m infiltrax | | Gypsum | | CaCl$_2$ | |
|---|---|---|---|---|---|---|---|---|---|---|---|
| 10 | | 1 | 2 | 3 | 4 | 5 | 6 | 7 | 8 | 9 | 10 |
| Location | | a | b | a | b | a | b | a | b | a | b |
| Open porosity | % | 14.1 | 11.6 | 22.2 | 22.6 | 31.3 | 23.9 | 30.5 | 20.8 | 18.0 | 17.7 |
| closed porosity | % | 0.9 | 0.6 | 0.8 | 0.8 | 0.6 | 0.7 | 0.6 | 1.4 | 1.2 | 1.1 |
| Total porosity | % | 15.0 | 12.2 | 23.1 | 23.4 | 32.0 | 24.6 | 31.1 | 22.2 | 19.3 | 18.7 |
| Connectivity | C | 24236 | 11924 | 35997 | 31111 | 73537 | 40532 | 64243 | 40343 | 25519 | 13600 |

Houston Farm Soil A Horizon.

| Treatment | | water 1 | 3 dS/m 3 | 5 dS/m 5 | Gypsum 7 | CaCl$_2$ 9 |
|---|---|---|---|---|---|---|
| Open porosity (percent) | % | 14.1 | 22.2 | 31.3 | 30.5 | 18.0 |
| Total porosity (percent) | % | 15.0 | 23.1 | 32.0 | 31.1 | 19.3 |
| closed porosity | % | 0.9 | 0.8 | 0.6 | 0.6 | 1.2 |
| Connectivity | | 24236.0 | 35997.0 | 73537.0 | 64243.0 | 25519.0 |

Figure 8:
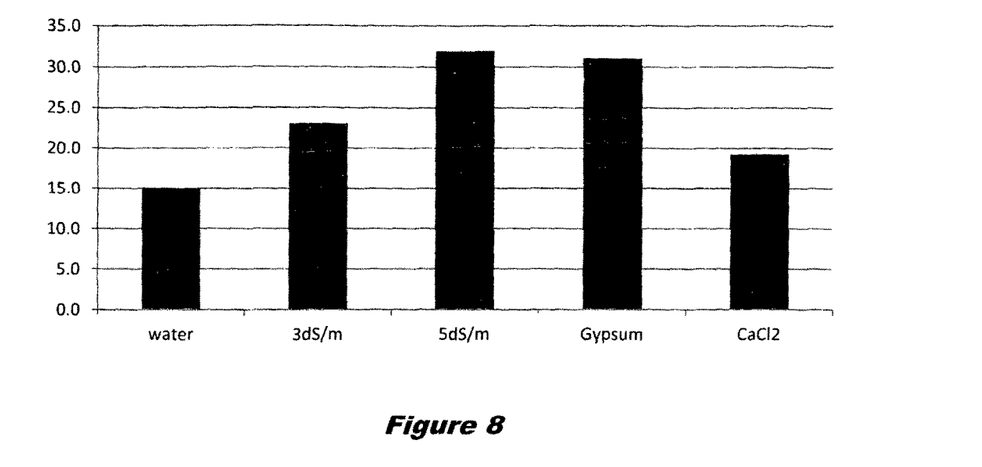
FIG. 8 shows a plot of the total porosity (%) of A horizon soil treated with treatment solutions T1 to T5 of Example 3.
Figure 9:
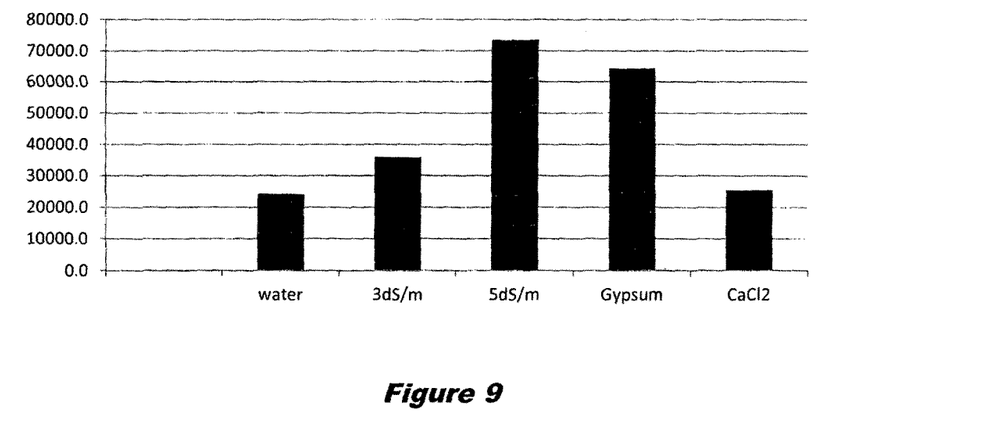
FIG. 9 shows a plot of the connectively of A horizon soil treated with treatment solutions T1 to T5 of Example 3.

The A horizon total porosity (%) and connectivity are shown in FIGS. 8 and 9.

Houston Farm Soil A/B Horizon

| Treatment | | water 2 | 3 dS/m 4 | 5 dS/m 6 | Gypsum 8 | CaCl$_2$ 10 |
|---|---|---|---|---|---|---|
| Location | | b | b | b | b | b |
| Open Porosity (percent) | % | 11.6 | 22.6 | 23.9 | 20.8 | 17.7 |
| Total Porosity (percent) | % | 12.2 | 23.4 | 24.6 | 22.2 | 18.7 |
| Closed Porosity (percent) | % | 0.6 | 0.8 | 0.7 | 1.4 | 1.1 |
| Connectivity | | 11924.0 | 31111.0 | 40532.0 | 40343.0 | 13600.0 |

Figure 10:
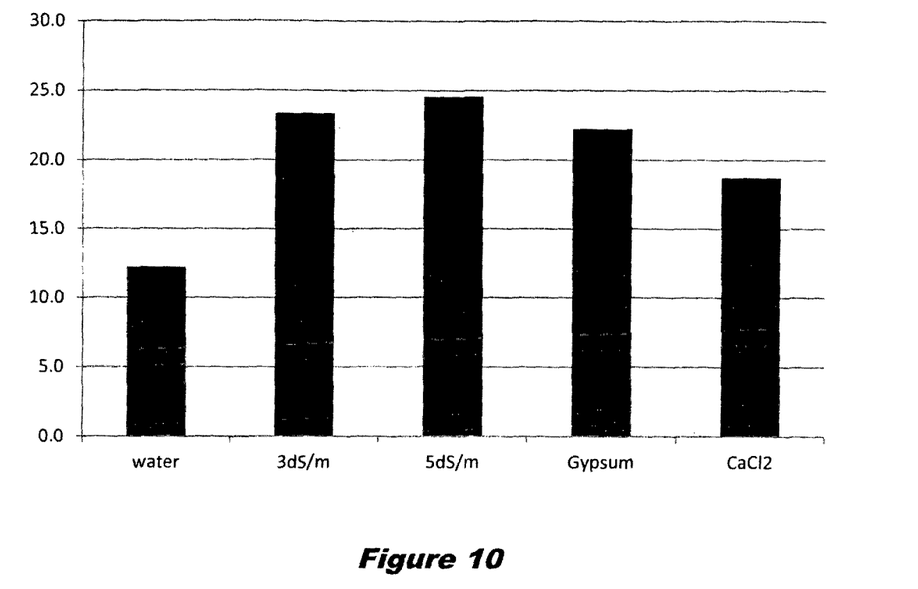
FIG. 10 shows a plot of the total porosity (%) of A/B horizon soil treated with treatment solutions T1 to T5 of Example 3.
Figure 11:
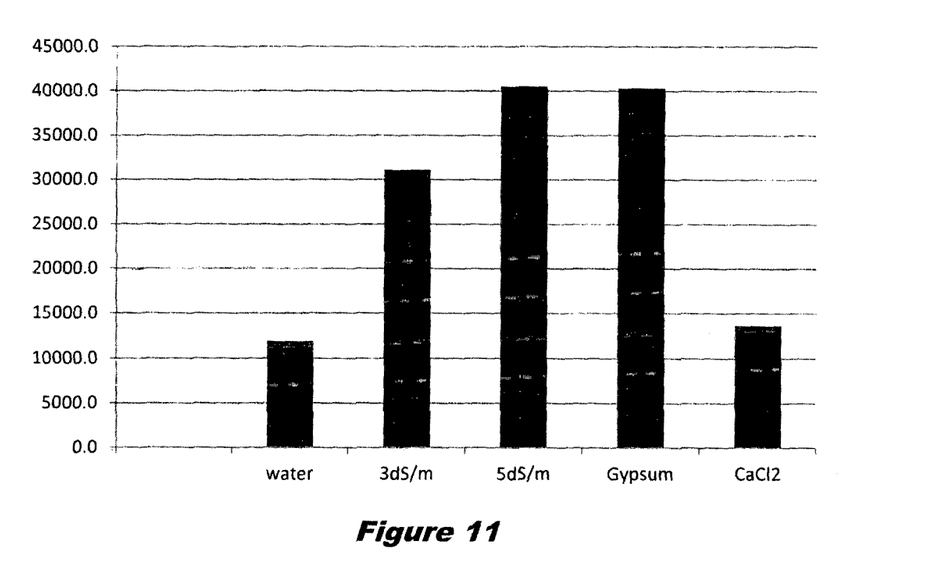
FIG. 11 shows a plot of the connectively of A/B horizon soil treated with treatment solutions T1 to T5 of Example 3.

The A/B horizon total porosity (%) and connectivity are shown in FIGS. 10 and 11.

The results show that the soil remediation and soil pore stabilising composition can be changed to suit changes in soil type. Soil testing has been performed in different soils to determine the nature of the changes in the soil remediation and soil pore stabilising composition to suit individual soil types. Soil Structural Stability testing was carried out to determine the variation in soil types and the components of the soil remediation and soil pore stabilising composition was adjusted accordingly. The most common alterations made to the soil remediation and soil pore stabilising composition to deal with common soil problems are changes in the electrolyte species (calcium, magnesium, potassium, sodium, ammonium). Other common changes are changes in wetting agent, penetrant and flocculant volumes as well as the lignosulfonates and chitosan.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

All publications mentioned in this specification are herein incorporated by reference. Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed in Australia or elsewhere before the priority date of each claim of this application.

The invention claimed is:

1. A soil remediation and soil pore stabilizing composition comprising:
    at least one electrolyte;
    at least one cofactor;
    at least 0.5 weight percent of at least one anionic surfactant based on the total weight of the composition;
    at least one elemental micronutrient;
    at least one penetrant;
    at least one polymer;
    at least one flocculating agent;
    at least one emulsifier;
    at least one soil stabilizer;
    at least one complexity agent; and
    at least one wetting agent;
    wherein said anionic surfactant is not a sulphonate;
    wherein said at least one elemental micronutrient is selected from one or more of the group consisting of: zinc salts, ferric salts, ferrous salts, magnesium salts, manganese salts, cupric salts, boron salts, molybdenum salts, and cobalt salts;
    wherein said at least one penetrant is selected from one or more of the group consisting of: di-octyl sulfosuccinate, polyoxyalkylene polymers, alkyl ethoxylated quaternary ammonium compounds, a nonionic surfactant being an ethoxylate and salicylic acid, or mixtures thereof;
    wherein said at least one polymer is selected from one or more of the group consisting of: synthetic anionic acrylic copolymers, poly(acrylamide-co-acrylic acid), polyelectrolytic polymers, starch or cellulose xanthate, acid-hydrolyzed cellulose microfibrils, chitosan, polyvinyl alcohol, hydrolysed polyethyl acrylates, polymethyl methacrylate, polycaproamide, hydrolyzed polyacrylonitrile (HPAN), isobutylene maleic acid (IBM), polyacrylamide (PAM), polyvinyl alcohol (PVA), sodium polyacrylate (SPA), vinylacetate maleic acid (VAMA) and hydrolyzed starch-polyacrylonitrile graft polymers;
    wherein said at least one flocculating agent is selected from one or more of the group consisting of: iron sulphate, iron chloride, isinglass, calcium silicate, sodium silicate, gelatin, guar gum, xanthan gum, chitosan, and potassium alginate;
    wherein said at least one emulsifier is selected from one or more of the group consisting of: polyethoxylated phenols, guar gum, xanthan gum, and pectin;
    wherein said at least one soil stabilizer is selected from one or more of the group consisting of: sodium humate, potassium humate, calcium humate, humic acid, fulvic acid, ulmic acid, calcium lignosulphonate, potassium lignosulphonate, magnesium lignosulphonate, sucrose, mannitose, glucose, fructose, corn steep liquor, corn starch, lactose, dextrose, raffinose, fructose phosphate, super sulphonated humate, mannitol, sorbitol, gluconic acid, pyruvic acid, malic acid, and glucaric acid;
    wherein said at least one complexing agent is selected from one or more of the group consisting of: saccharic acid, tannic acid, succinic acid, citric acid, calcium lignosulphonate, potassium lignosulfonate, ethylenediamine-N,N'-diaectic acid (EDDA), ethylenediamine-N,N,N',N'-tetraacetatic acid (EDTA), trans-1,2-diaminecyclohexane-N,N,N',N'-tetraacetatic acid (CDTA), and N-(2-hydroxyethyl)ethylenediaminetriaectic acid (HEDTA); and
    wherein said at least one wetting agent is selected from one or more of the group consisting of: alkylphenol ethoxylates (APE), nonylphenol ethoxylates (NPE), polyoxyethylene (POE), anionic linear surfactants, yucca or seaweed mixed with APE, EO/PO block copolymers, organosilicones, block copolymer and APG blends, and methyl capped block copolymers.

2. The soil remediation and soil pore stabilizing composition of claim 1, wherein the electrolyte is selected from one or more of the group consisting of: sodium salts, potassium salts, calcium salts, magnesium salts, chloride salts, hydrogen phosphate salts, hydrogen carbonate (bicarbonate) salts, reacted hydrated calcium salts, acetate salts, ammonium salts, sulphate salts, nitrate salts and iron salts.

3. The soil remediation and soil pore stabilizing composition of claim 2, wherein the cofactor is selected from one or more of the group consisting of: thiamine pyrophosphate, thiamine monophosphate, thiamine mononitrate, riboflavin phosphate, nicotinic acid, folinic acid, pantothenic acid, cyanocobalomin, inositol monophosphate, inositol macinate, and inositol hexophosphate.

4. The soil remediation and soil pore stabilizing composition of claim 1, wherein the anionic surfactant is an alkyl sulphate selected from the group consisting of: ammonium lauryl sulphate, sodium lauryl sulphate and the related alkyl-ether sulphate, and sodium myreth sulphate.

5. The soil remediation and soil pore stabilizing composition of claim 1, wherein the composition is an aqueous solution.

6. The soil remediation and soil pore stabilizing composition of claim 1 wherein said polyoxyalkylene polymer is an alkyl amine oxide selected from the group consisting of decyl dimethyl amine oxide, lauryl dimethyl amine oxide, myristyl dimethyl amine oxide, cetyl dimethyl amine oxide, or mixtures thereof.

7. A method for remediating and stabilizing a soil, the method comprising; applying a composition to soil;

the composition comprising:
- at least one electrolyte,
- at least one cofactor, at least 0.5 weight percent of at least one anionic surfactant based on the total weight of the composition,
- at least one elemental micronutrient,
- at least one penetrant,
- at least one polymer,
- at least one flocculating agent,
- at least one emulsifier,
- at least one soil stabilizer,
- at least one complexity agent, and
- at least one wetting agent;

wherein said anionic surfactant is not a sulphonate, wherein said at least one elemental micronutrient is selected from one or more of the group consisting of: zinc salts, ferric salts, ferrous salts, magnesium salts, manganese salts, cupric salts, boron salts, molybdenum salts, and cobalt salts;

wherein said at least one penetrant is selected from one or more of the be group consisting of: di-octyl sulfosuccinate, polyoxyalkylene polymers alkya ethoxylated quaternary ammonium compounds a nonionic surfactant being an ethoxylate and salicylic acid, or mixtures thereof;

wherein said at least one polymer is selected from one or more of the group consisting of: synthetic anionic acrylic copolymers, poly(acrylamide-co-acrylic acid), polyelectrolytic polymers, starch or cellulose xanthate, acid-hydrolyzed cellulose microfibrils chitosan polyvinyl alcohol, hydrolysed polyethyl acrylates, polymethyl methacrylate,polycaproamide, hydrolyzed polyacrylonitrile (HPAN), isobutylene maleic acid (IBM), polyacrylamide (PAM), polyvinyl alcohol (PVA), sodium polyacrylate (SPA), vinylacetate maleic acid (VAMA) and hydrolyzed starch-polyacrylonitrile graft polymers;

wherein said at least one flocculating agent is selected from one or more of the group consisting of: iron sulphate, iron chloride, isinglass, calcium silicate, sodium silicate, gelatin, guar gum, xanthan gum, chitosan, and potassium alginate;

wherein said at least one emulsifier is selected from one or more of the group consisting of: polyethoxylated phenols, guar gum, xanthan gum, and pectin;

wherein said at least one soil stabilizer is selected from one or more of the group consisting of: sodium humate, potassium humate, calcium humate, humic acid, fulvic acid, ulmic acid, calcium lignosulphonate, potassium lignosulphonate magnesium lignosulphonate, sucrose, mannitose glucose, fructose, corn steep liquor, corn starch, lactose, dextrose, raffinose, fructose phosphate, super sulphonated humate, mannitol, sorbitol, gluconic acid, pyruvic acid, malic acid, and glucaric acid;

wherein said at least one complexing agent is selected from one or more of the group consisting of: saccharic acid, tannic acid, succinic acid, citric acid, calcium lignosulphonate, potassium lignosulfonate, ethylenediamine-N,N'-diaectic acid (EDDA), ethylenediamine-N,N,N',N '-tetraaectic acid (EDTA), trans-1,2-diaminecyclohexane-N,N,N',N'-tetraacetatic acid (CDTA), and N-(2-hydroxyethyl)ethylenediaminetriaectic acid (HEDTA); and wherein said at least one wetting agent is selected from one or more of the group consisting of: alkylphenol ethoxylates (APE), nonylphenol ethoxylates (NPE), polyoxyethylene (POE), anionic linear surfactants, yucca or seaweed mixed with APE, EO/PO block copolymers, organosilicones, block copolymer and APG blends, and methyl capped block copolymers.

8. The method of claim 7, wherein the method is carried out as an in-furrow treatment.

9. The method of claim 7, wherein the electrolyte is selected from one or more of the group consisting of: sodium salts, potassium salts, calcium salts, magnesium salts, chloride salts, hydrogen phosphate salts, hydrogen carbonate (bicarbonate) salts, reacted hydrated calcium salts, acetate salts, ammonium salts, sulphate salts, nitrate salts and iron salts.

10. The method of claim 9, wherein the cofactor is selected from one or more of the group consisting of: thiamine pyrophosphate, thiamine monophosphate, thiamine mononitrate, riboflavin phosphate, nicotinic acid, folinic acid, pantothenic acid, cyanocobalomin, inositol monophosphate, inositol macinate, and inositol hexophosphate.

11. The method of claim 7, wherein the anionic surfactant is an alkyl sulphate selected from the group consisting of: ammonium lauryl sulphate, sodium lauryl sulphate and the related alkyl-ether sulphate, and sodium myreth sulphate.

12. The method of claim 7, wherein the composition is an aqueous solution.

13. The method of claim 7, wherein said polyoxyalkylene polymer is an alkyl amine oxide selected from the group consisting of decyl dimethyl amine oxide, lauryl dimethyl amine oxide, myristyl dimethyl amine oxide, cetyl dimethyl amine oxide, or mixtures thereof.

* * * * *